(12) United States Patent
Morishita et al.

(10) Patent No.: US 7,630,379 B2
(45) Date of Patent: Dec. 8, 2009

(54) SYSTEMS AND METHODS FOR IMPROVED NETWORK BASED CONTENT INSPECTION

(75) Inventors: Isao Morishita, Yokohama (JP); Hongwen Zhang, Calgary (CA); Husam Kinawi, Calgary (CA)

(73) Assignee: Wedge Networks Inc. (CA)

( * ) Notice: Subject to any disclaimer, the term of this patent is extended or adjusted under 35 U.S.C. 154(b) by 367 days.

(21) Appl. No.: 11/620,556

(22) Filed: Jan. 5, 2007

(65) Prior Publication Data

US 2007/0160062 A1 Jul. 12, 2007

Related U.S. Application Data

(60) Provisional application No. 60/827,338, filed on Sep. 28, 2006, provisional application No. 60/766,250, filed on Jan. 5, 2006.

(51) Int. Cl.
H04L 12/56 (2006.01)
(52) U.S. Cl. .............. 370/395.31; 713/188; 726/22
(58) Field of Classification Search ............ 370/395
See application file for complete search history.

(56) References Cited

U.S. PATENT DOCUMENTS

| | | | | |
|---|---|---|---|---|
| 6,154,844 | A | 11/2000 | Touboul et al. | 713/201 |
| 6,735,700 | B1 | 5/2004 | Flint et al. | 713/200 |
| 7,010,807 | B1 | 3/2006 | Yanovsky | 726/24 |
| 7,080,407 | B1 | 7/2006 | Zhao et al. | 726/24 |
| 7,203,960 | B1 * | 4/2007 | Painter | 726/22 |
| 7,392,544 | B1 * | 6/2008 | Pavlyushchik | 726/24 |
| 2004/0210754 | A1 | 10/2004 | Barron et al. | 713/153 |
| 2005/0050362 | A1 | 3/2005 | Peles | 713/201 |
| 2006/0015940 | A1 | 1/2006 | Zamir et al. | 726/22 |

(Continued)

FOREIGN PATENT DOCUMENTS

GB 2 416 891 2/2006

(Continued)

OTHER PUBLICATIONS

International Search Report, Apr. 6, 2007, 4 pages.

*Primary Examiner*—Kwang B Yao
*Assistant Examiner*—Jung-Jen Liu
(74) *Attorney, Agent, or Firm*—St. Onge Steward Johnston & Reens LLC

(57) ABSTRACT

The invention relates to network based content inspection (NBCI). More specifically, the invention provides systems and methods for improved NBCI in complex networks that are typical for enterprises and service providers. These networks are shared by large numbers of concurrent users who send and retrieve application content of various sizes via a variety of communication protocols. This invention improves the efficiency of the NBCI of an individual communication session by learning from the processing results of other communication sessions which may be carried via different network protocols. In addition, the invention provides methods that do not weaken the overall security for the network and that improve the stability of NBCI systems by minimizing the risk of system resource exhaustion if subjected to a burst of large payloads. The invention also improves perceived network stability by preventing the system resources from being "live-locked" by a few large content inspection tasks. Further still, the invention improves the cost-effectiveness of NBCI by allowing the optimization knowledge gained by one NBCI node be shared with other nodes.

19 Claims, 11 Drawing Sheets

U.S. PATENT DOCUMENTS

| | | |
|---|---|---|
| 2006/0075501 A1 | 4/2006 | Thomas et al. ................. 726/24 |
| 2006/0133377 A1* | 6/2006 | Jain ........................... 370/392 |
| 2006/0143713 A1* | 6/2006 | Challener et al. ............. 726/24 |
| 2006/0221658 A1 | 10/2006 | Gould et al. .................. 365/49 |
| 2007/0006293 A1 | 1/2007 | Balakrishnan et al. ........ 726/13 |
| 2007/0083930 A1* | 4/2007 | Dumont et al. ............... 726/24 |
| 2008/0016568 A1* | 1/2008 | Szor et al. ..................... 726/22 |

FOREIGN PATENT DOCUMENTS

| | | |
|---|---|---|
| WO | WO 2004/081761 | 9/2004 |
| WO | WO 2005/109788 | 11/2005 |

* cited by examiner

| Message Digest 20 | Inspection State 43 | Inspection Result 14 | Inspection Time 44 | Content Size 45 | etc |

Content Inspection History Record 42

FIGURE 3

SYSTEMS AND METHODS FOR IMPROVED NETWORK BASED CONTENT INSPECTION

CROSS-REFERENCE TO RELATED APPLICATIONS

This patent application claims the benefit of, under Title 35, United States Code, Section 119(e), U.S. Provisional Patent Application No. 60/827,338, filed on Sep. 28, 2006 and U.S. Provisional Patent Application No. 60/766,250, filed Jan. 5, 2006.

FIELD OF THE INVENTION

The invention relates to network based content inspection (NBCI). More specifically, the invention provides systems and methods for improved NBCI in complex networks that are typical for enterprises and service providers. These networks are shared by large numbers of concurrent users who send and retrieve application content of various sizes via a variety of communication protocols. This invention improves the efficiency of the NBCI of an individual communication session by learning from the processing results of other communication sessions which may be carried via different network protocols without weakening. the overall security of the network. In addition, the invention provides methods to improve the stability of NBCI systems by minimizing the risk of system resource exhaustion if subjected to a burst of large payloads. The invention also improves perceived network stability by preventing the system resources from being "live-locked" by a few large content inspection tasks. Further still, the invention improves the cost-effectiveness of NBCI by allowing the optimization knowledge gained by one NBCI node be shared with other nodes.

BACKGROUND OF THE INVENTION

Network based content inspection (NBCI) is a technology that accumulates data packets transmitted via a data network, reconstructs the accumulated packets into payloads of application level protocols, inspects the reconstructed payloads, and invokes predefined actions according to the result of the inspection. Network based content inspection is increasingly becoming an enabling method of monitoring network data in a number of important applications such as cyber surveillance, content access control, network traffic monitoring, anti-virus, anti-spamming, content annotation, content caching, and other applications.

One problem of past methods of NBCI is reduced network performance as a result of the time required for content reconstruction, inspection, and manipulation. Generally, network performance can become severely compromised when there are many users accessing large volumes of compressed content. As the exchange of large archived content is common over today's data networks, the inspection of such content can be highly inefficient at certain times, for example, when there is a new release of popular software, digital images, videos, ring-tones, and other compressed content that are being accessed by a large number of users within a relatively short time-frame on a network.

It is also known that certain inspection tasks, such as 100% accurate polymorphic virus scanning, are NP-Complete problems. For these tasks, and with the increase of content size, the computational resources required to complete such inspection tasks grow exponentially which translates into long network latency for NBCI systems, which in turn results in low network throughput.

Performance is not the only issue. NBCI systems have a finite number of system resources, thus, when a system is subjected to communication sessions that carry large archived payloads, system resource exhaustion will happen. As a result, the system will either stop responding to new communication sessions, or will fail to open, which means that the very function of NBCI will not be applied to the new communication sessions. Therefore, past NBCI systems are generally not stable for today's enterprise and service provider networks.

A typical enterprise or service provider may deploy NBCI systems at many network junctions. Past approaches often duplicate the inspection of different instances of the same content in each of the NBCI systems. Therefore, on the whole network level, computing resources are wasted on duplicated tasks.

In other scenarios, when many instances of the same content arrive at the same time, past NBCI system will spend system resources inspecting each of the instances. Such duplication results in more resources being required which drives up the cost of NBCI systems.

A review of the prior art indicates that several technology exist in the art that enhance the performance of NBCI systems.

For example, US 2006/0221658 (Gould) uses a programmable finite state machine implemented as an integrated circuit to improve the memory usage efficiency of applying pattern matching against data payload for the purpose of content inspection. However, as today's network payloads typically contain archived content and while pattern matching is a necessary step for several NBCI applications, significant amounts of CPU cycles and memory must still be spent on de-archiving and re-archiving the content. Moreover, this cost is encountered for the inspection of every instance of the content on every NBCI system.

U.S. Pat. No. 6,154,844 (Touboul) describes a method in which a Downloadable Security Profile (DSP) is attached to the content payload. In this system, an NBCI will not inspect the payload if the payload can be associated with a DSP. While this approach effectively reduces the computation needed for inspecting the same content in the NBCI systems along the path of the content transmission, the method of attaching a DSP to the payload will cause compatibility issues downstream as the downstream systems will have to understand this DSP. In addition, for small payloads, such as those typical for short message services (SMS), this method significantly increases the size of the resulting payload. Still further, for large, archived payloads, this method does not take advantage of the fact that some components of the payload may have already been inspected. In addition, this method does not solve the system resource exhaustion issue caused by high concurrency of network data traffic or the system resource "live-lock" issue caused by inspection of large content.

With the rapid growth of network bandwidth, from 100 Mbits, to 1 Gbits, and to 10 Gbits and beyond, the importance of NBCI performance is increasingly becoming paramount in the effective management of large, complex networks. As a result, there continues to be a need for NBCI methods that effectively and efficiently process data payloads in order to improve the efficiency, stability while reducing NBCI costs without compromising network speeds.

SUMMARY OF THE INVENTION

In accordance with the invention, there is provided a method of enhancing network based content inspection for data payloads within heavy traffic data networks that are typical for service providers and enterprises by:

subjecting a data payload that may be carried via a variety of communication protocols to a content recognition module for determining if the payload or a component thereof has been previously inspected, or is being inspected; and a) if the content has been previously inspected, associate this payload with a previous inspection result for policy enforcement without inspecting this payload;

b) if a previous instance of the content is being inspected, in order to preserve the NBCI system resources, the inspection of the instance will wait until the inspection of the being inspected instance is completed;

once inspection is completed, delivering the payload and inspection result.

In another embodiment, the method includes subjecting an unrecognized payload to content inspection to produce an inspection result and subsequently storing the inspection result in a content recognition module.

In another embodiment, for a given content inspection task, the NBCI system resource allocation priority is adjusted with the passage of time so that other communication sessions can have a share of system resources.

In yet another embodiment, the method allows several NBCI systems in a network to learn from each other's content inspection results.

In further embodiments, the method provides further functionality including any operative combination of various functions as described below.

In one embodiment, the content recognition module includes a one-way hash function for calculating a message digest of the data payload and wherein the message digest is compared to previously stored message digests from previously inspected data payloads. Message digests from previously inspected data payloads are stored in a look-up table and the content recognition module returns a previously inspected result if the message digest of the data payload is the same as a previously stored message digest. As well, the content recognition module returns a null result if the message digest of the data payload does not correspond to a previously stored message digest. This payload is then subjected to content inspection and is further subjected to a one-way hash function to calculate a message digest of the unrecognized result and the message digest subsequently stored in the content inspection module.

In further embodiments, the knowledge of what content has been inspected or what content is under inspection is stored in a Content Inspection History Lookup (CIHL) table as a record. Each record, hereafter referred to as CIH record, in the CIHL table is indexed with a unique signature of the content. This signature is in the form of a message digest such as those created with SHA-1, MD-5, etc. Each entry also contains a field to indicate if the content is currently under inspection.

The CIHL table may also contain a field for the inspection result which may be instructions to take subsequent action with respect to the data payload. Additional information may be added as fields to a CIH record. In one embodiment, this additional information may be time of inspection that may be part of a system to enhance security such that a data payload is no longer marked as inspected if the time of creation information exceeds a pre-determined value. Other information may include size information.

In a further embodiment, the system and method enable many copies of data payloads of the same content entering a network via a variety of communication sessions and via different communication protocols to be effectively and efficiently inspected.

In a further embodiment, the system and methods associate a message digest with supplementary information such as time stamp, payload size, etc, to minimize the risk of message digest collision-based attacks against a NBCI system.

In another aspect of the invention, the payload is data of an application level network protocol and the payload may be decomposed prior to content inspection.

In another embodiment, the invention provides a system implemented on a computer or a network of computers for enhancing network based content inspection of a number of concurrently received data payloads comprising:

a content recognition module for recognizing if each data payload has been previously inspected for content or is currently under inspection and a) allowing a recognized data payload to be delivered without content inspection; and b) subjecting an unrecognized data payload to content inspection to produce a content inspection result and subsequently storing the content inspection result in the content recognition module.

In another aspect of the invention, the inspections of multiple data payloads are scheduled by a content inspection scheduler that assigns and modifies the system resource allocation priority to an inspection task.

In various embodiments, the content inspection module is a co-processor and/or the content inspection module utilizes CAM (Content-Addressable Memory).

Further still, the system may include at least two content inspection modules operatively connected to a common look-up table, the results of content inspection on at least two content inspection modules is added to the common look-up table and/or the content recognition look-up tables are synchronized with each other.

BRIEF DESCRIPTION OF THE DRAWINGS

The invention is described with reference to the figures wherein:

FIG. 3 is the structure of a content inspection history (CIH) record;

DETAILED DESCRIPTION OF THE INVENTION

With reference to the Figures, systems and methods for optimizing the computation required to perform content inspection on concurrently received network data packet payloads are described. In the context of this description "concurrently" means data payloads received by a computer network within a short time period such that the system resources considers the data payloads to have been effectively received at the same time or within a short time period.

Figure 1:
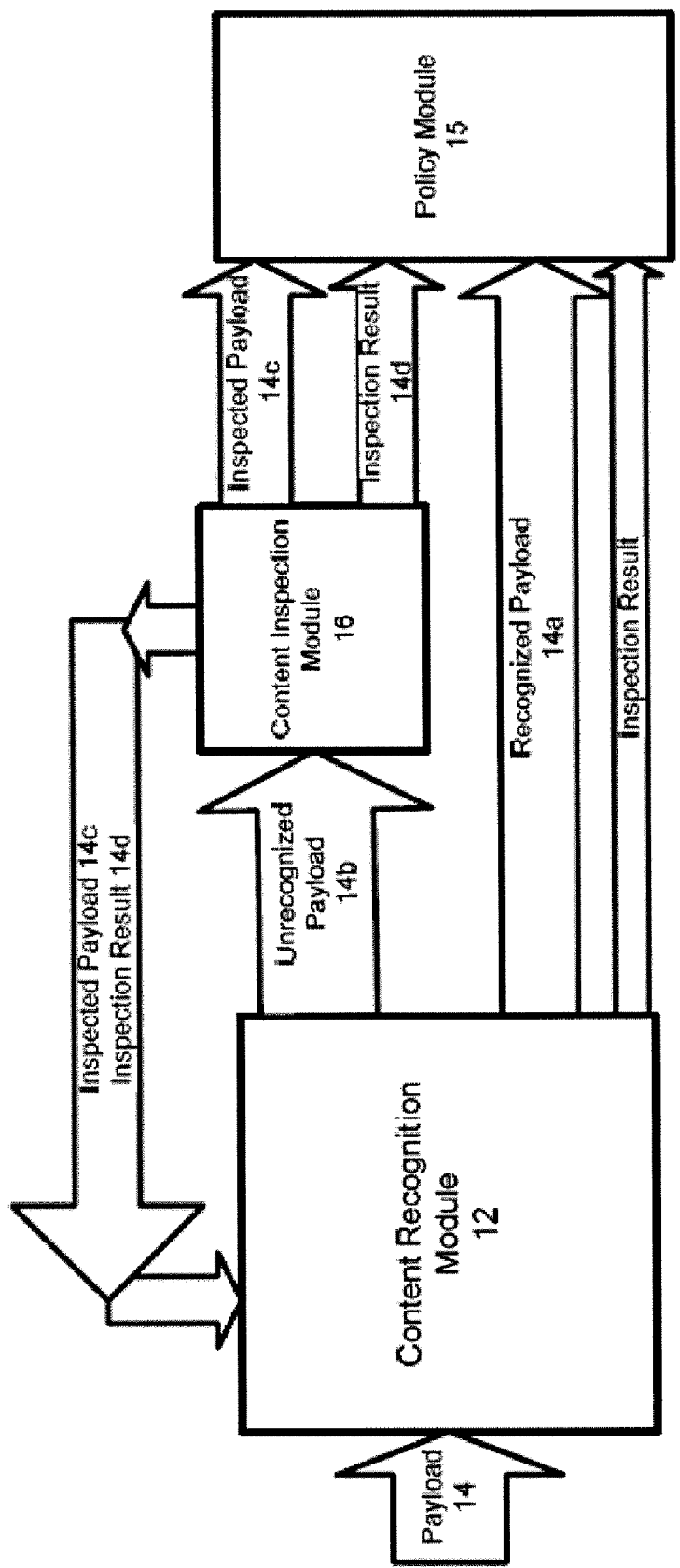
FIG. 1 is a schematic block diagram showing the interaction of a content recognition module and a content inspection module within a computer system, a co-processor, or a software module in accordance with one embodiment of the invention.
Figure 2:
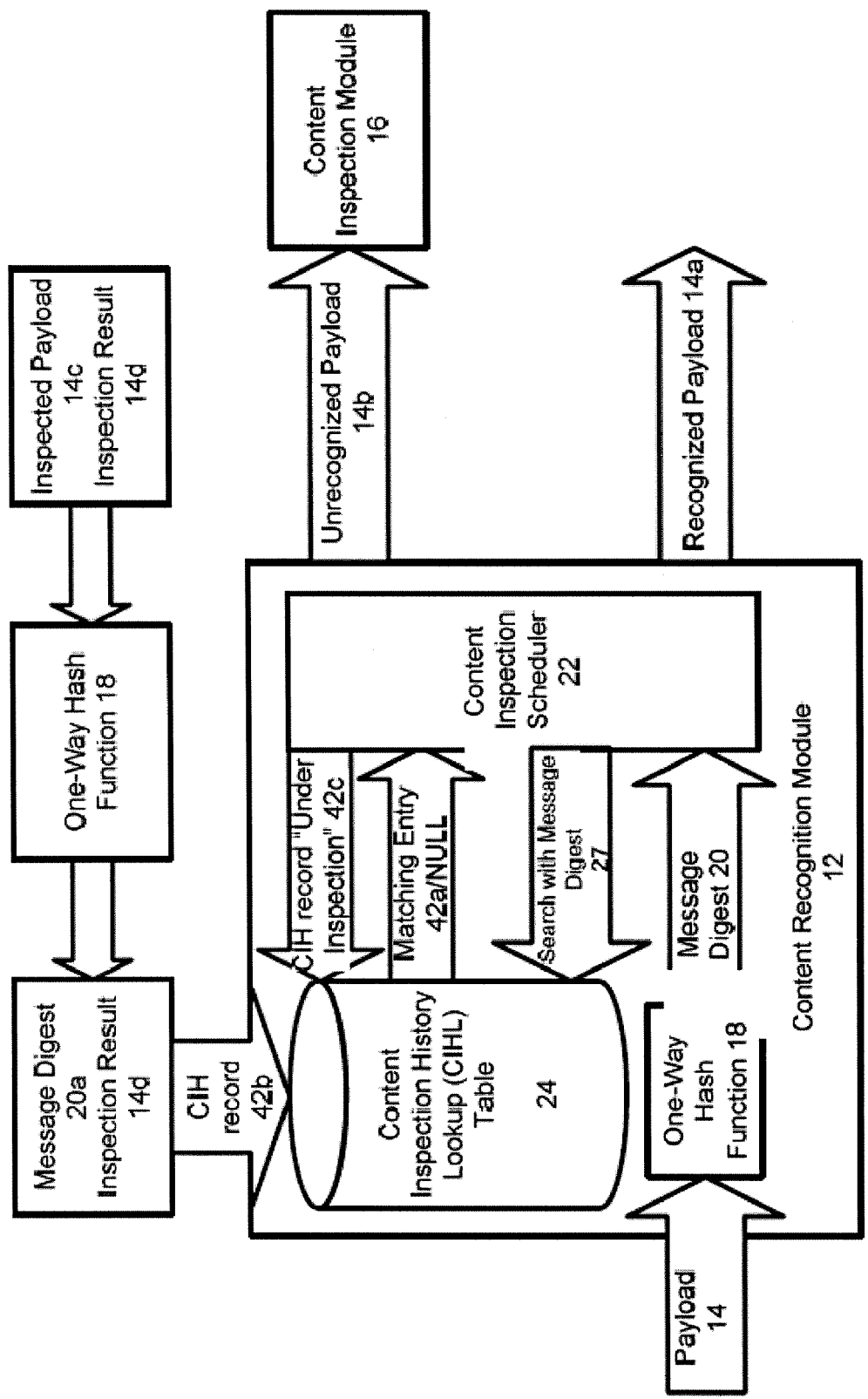
FIG. 2 is a schematic block diagram of an implementation of the content recognition module.
Figure 4:
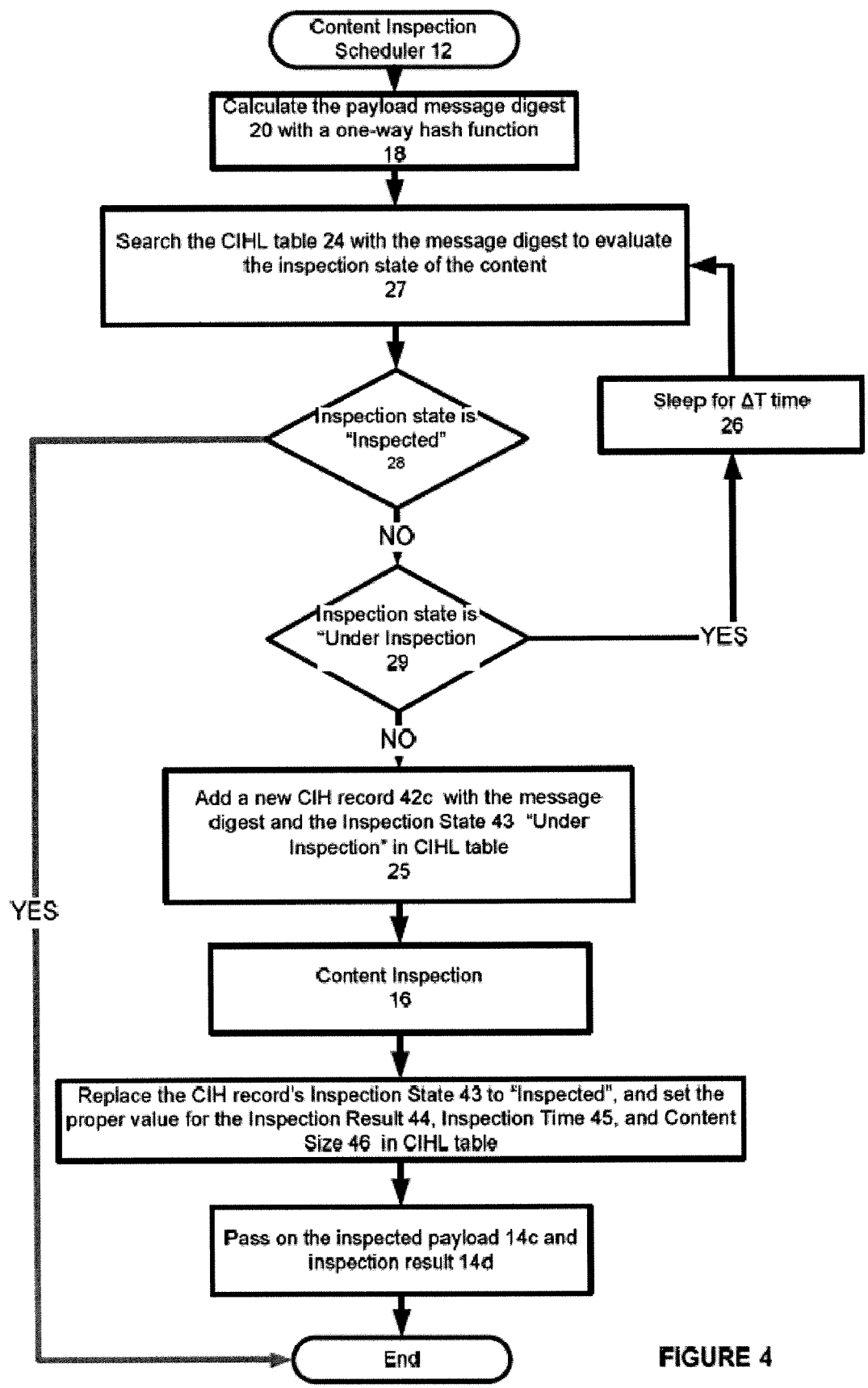
FIG. 4 is a flow diagram of a method of processing a payload in accordance with one embodiment of the invention.
Figure 5:
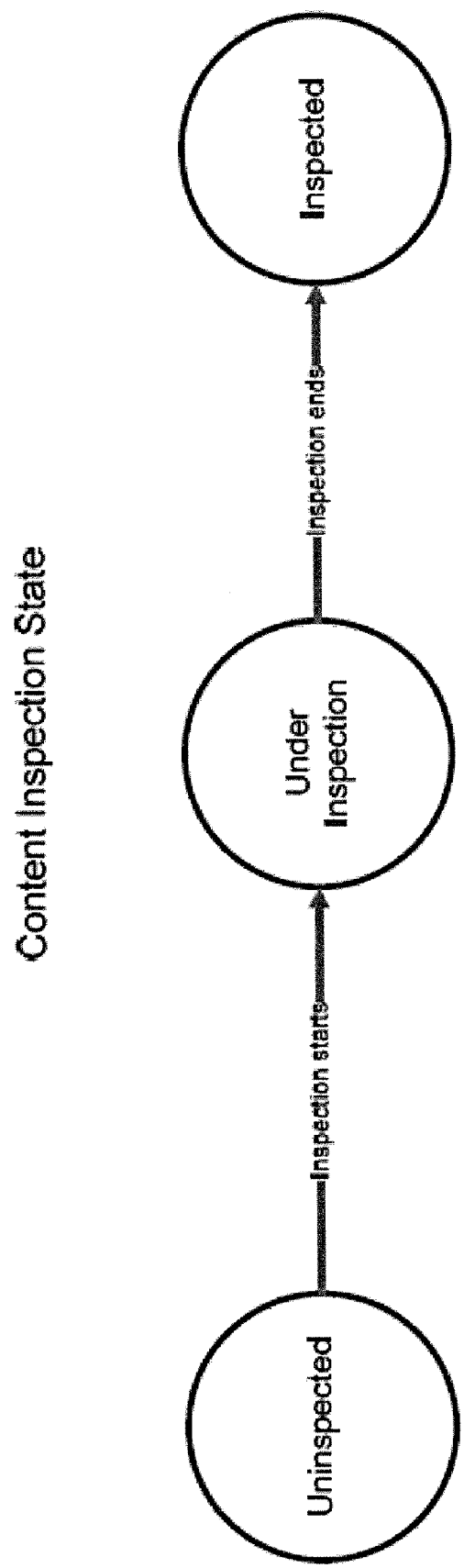
FIG. 5 illustrates the state machine of the content inspection state transition.

With reference to FIG. 1, a content recognition module (CRM) 12 receives a data payload 14. The CRM 12 inspects the data payload to determine if the content of this payload 14 has been inspected previously or is currently under inspection. If the CRM 12 recognizes that the content of the payload 14 has been previously inspected, the CRM will deliver the recognized payload 14a (together with an inspection result as explained below) without subjecting the payload to content inspection. If the CRM 12 determines the payload is an unrecognized payload (that is, the payload has not been inspected previously), the unrecognized payload 14b is delivered to a content inspection module (CIM) 16. The content inspection module 16 calculates the inspection result and delivers the inspected payload 14c together with the inspection result. If the CRM recognizes that the payload 14 is under inspection, the CRM will delay processing of other payloads containing the same content.

A policy module 15 will apply a set of operations, such as the downstream delivery of the recognized payload 14a, or modify the payload, based on business specific policies. An inspected payload 14c and inspection result 14d is returned to the CRM 12 in order that subsequent receipt of a similar payload does not pass through the content inspection module 16. Generally, an inspection result is one or more markers that indicate that the content has been inspected and/or classified, and that enable other functions to be performed on the payload according to pre-determined policies.

With reference to FIGS. 2, 3, 4 and 5, the functionality of the CRM 12 is described. Initially, the payload 14 is passed through a one-way hash function to calculate a message digest 20 of the payload. The message digest is then passed through a Content Inspection Scheduler (CIS) 22 that compares the message digest 20 with previously stored message digests within a Content Inspection History Lookup (CIHL) Table 24. Each record 42 (FIG. 3) within the CIHL Table 24 is uniquely identified with a message digest. If a null matching record is found, meaning that the digest does not correspond to a previously stored digest, the payload content 14b is passed to the content inspection module 16 for inspection by the content inspection module 16. The content is then marked as "Under Inspection" 25 (FIG. 4) by adding a CIH record 42c into the CIHL table 24. This record will have its Inspection State 43 set to the value of "Under inspection". The content inspection module 16 scans the payload for content and classifies the content based on pre-determined criteria.

After inspection, the newly inspected content 14c is passed through the one-way hash-function to calculate a message digest 20a of the newly inspected content 14c. A CIH record 42b is inserted into the CIHL Table 24. This entry has the message digest 20a, the Inspection State "Inspected", the Inspection Result 14d, and optionally other supplementary information as will be explained in greater detail below.

If the comparison returns a matching CIH record 42 with the Inspection State field 43 being "Under Inspection" (Step 29), meaning a previous payload carrying the same content is currently being inspected, the processing of the latter payload content will wait for a period of time 26 before continuing. When the system determines that the inspection state of the previous payload content (FIG. 4, step 27) has changed to "inspected", the latter payload content will be subjected to content recognition.

If the comparison (step 28) returns a matching CIH record 42 with the Inspection State field 43 being "Inspected", meaning that the digest corresponds to the message digest of previously inspected content, the payload by-passes the content inspection module 16 as recognized payload 14a.

The one-way hash function may be a known Secure Hash Algorithm (SHA), such as SHA-1, MD2, MD4, MD5, variations thereof or other hashing algorithms as known to those skilled in the art.

Figure 6:
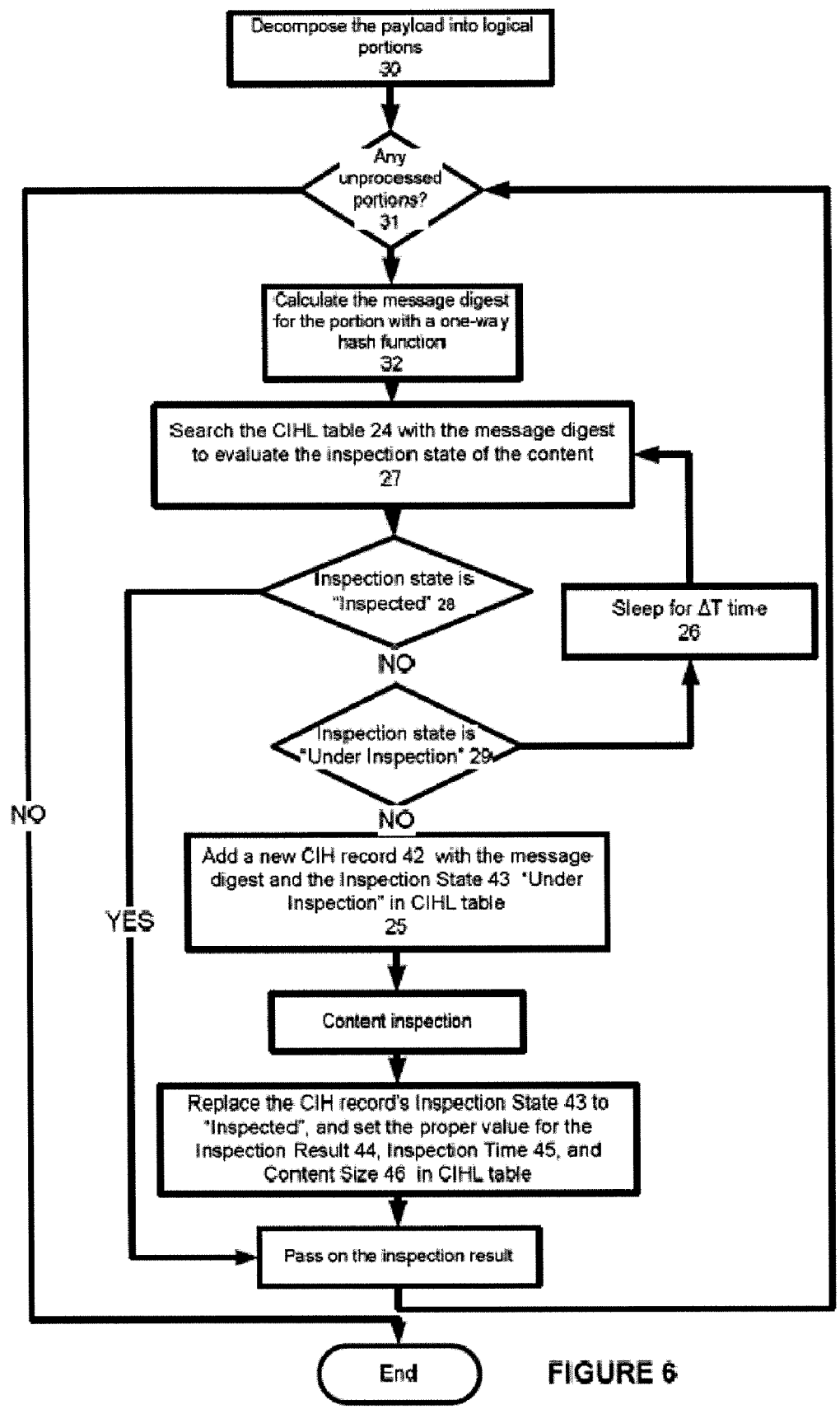
FIG. 6 is a flow diagram of a method of processing a payload including decomposition of the payload and partial recognition of the payload where content inspection is only conducted for portions not previously inspected.

With reference to FIG. 6, an alternate embodiment is described that further enhances the efficiency of content inspection. In this embodiment, a methodology allowing partial recognition of the payload content is conducted in order that content inspection is only needed for the portion of the payload content that has not been previously inspected.

In this embodiment, the payload is decomposed into logical portions 30 and each portion is evaluated to determine if it has been inspected. If the algorithm determines that there are un-inspected portions (step 31), a message digest (step 32) is calculated for the un-inspected portions. Each message digest is then searched within the CIHL table as described above.

Decomposition may be achieved by breaking down a payload into logical portions such as by attachment within an email, or the file content within a zip file.

Scheduling Manager

In a preferred embodiment, scheduling the content inspection of multiple inspection tasks is conducted to prevent system resource exhaustion in the event of the rapid or simultaneous arrival of many different data payloads, many instances of the same content, or in the event of a deny-of-service attack. Scheduling will ensure that the system resources are efficiently utilized to complete content inspection and are spent on applying the content inspection algorithms to one only instance of any multiple instances. This is achieved by giving much lower priority to time-consuming or system resource demanding content processing tasks. Scheduling is accomplished by utilizing the content inspection state (ie un-inspected, under-inspection or inspected) together with information relating to the number of required inspection tasks, the time of receipt of an inspection task and the size of the inspection task.

Figure 7:
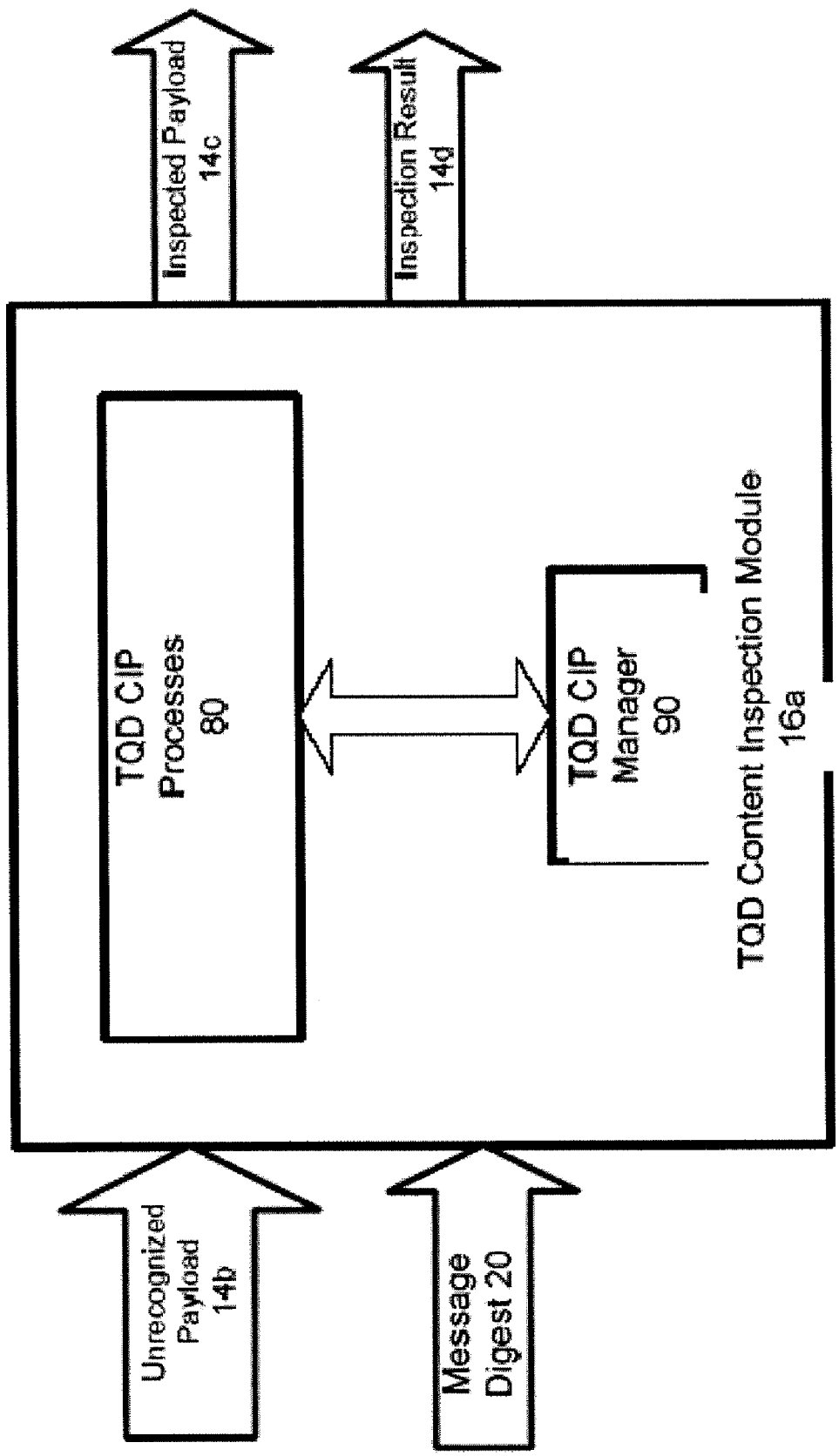
FIG. 7 is a schematic block diagram of an implementation of the content inspection module.
Figure 8:
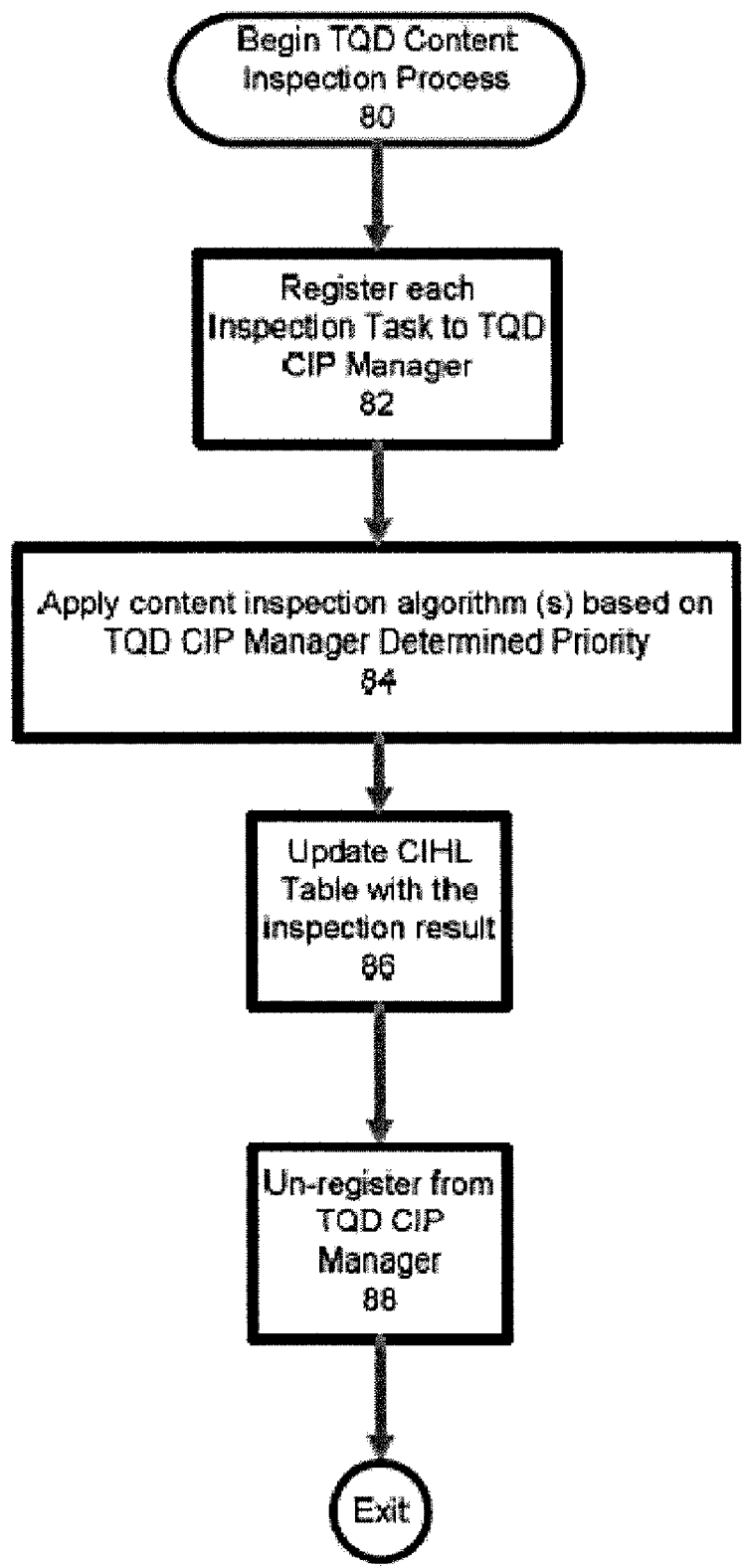
FIGS. 8 and 8A are flow diagrams of a method of using a "Time Quantum Divided" strategy to apply content inspection algorithms to a payload in accordance with one embodiment of the invention.
Figure 8A:
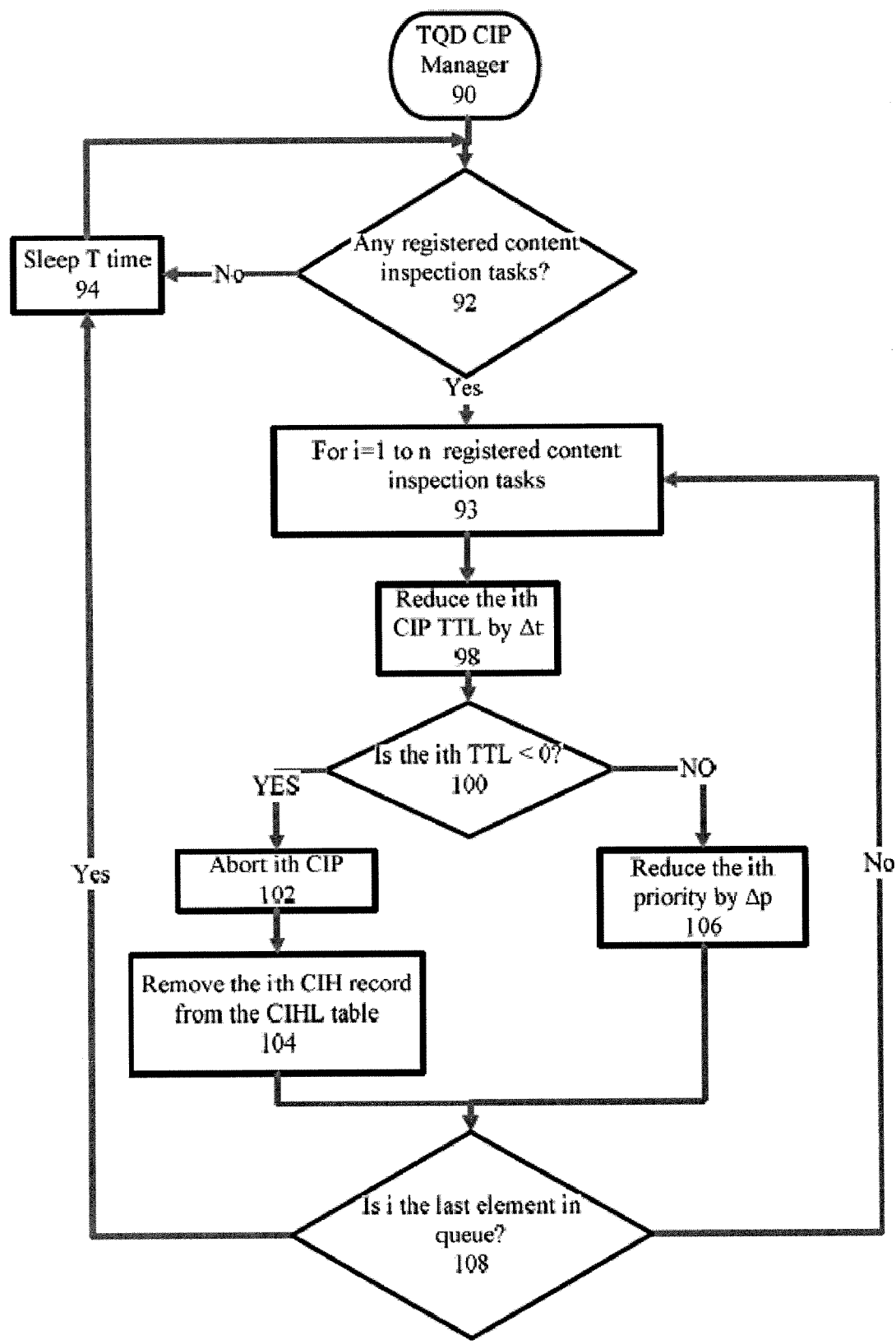

FIGS. 7, 8 and 8A describe one embodiment of the Content Inspection Module (CIM) 16a using a "Time Quantum Divided" (TQD) content inspection process scheduling strategy. This process enables the system to enhance speed of service to multiple users accessing a network by decreasing priority for a content inspection process with the passage of time. For example, in a situation where there are 100 users accessing a network, and 99 of those users are attempting to pass small payloads (eg. a 1-2 kb file) through the network and 1 user is attempting to pass a larger file (eg. a 100 Mb file) through the network, the scheduling manager will assign priority and allocate system resources based on both the size of each inspection task and the time taken to complete each content inspection task in order to minimize or prevent system resources being consumed by the single, larger inspection task, thus preventing each of the multiple users passing smaller payloads having to wait for the completion of the single larger inspection. That is, the system is able to prevent "live-lock" of the system resources by lengthy content inspection tasks.

As shown in FIGS. 8 and 8A, a content inspection process 80 starts by registering each content inspection task with the TQD CIP manager (FIG. 8, step 82) as each content packet requiring inspection arrives thus defining "n" inspection tasks. Upon registration, the TQD CIP manager 90 (FIG. 8A) periodically adjusts priority for each content inspection task such that each content inspection task is completed in a manner to maintain quality of service to multiple users by balancing the time to complete an inspection as determined by the number of inspection tasks, and the relative size of each inspection task. Once the inspection algorithms have been completed (step 84) based on the TQD CIP manager 90 assigned priority, the CIHL table is updated (step 86) with the inspection result and the content inspection process 80 unregisters a specific content inspect task from the TQD CIP manager (step 88).

As content inspection tasks are being registered and unregistered from the TQD CIP manager 90, the TQD CIP manager 90 continuously loops through each of the registered content inspection tasks and reviews and updates the status or priority of each content inspection task.

With reference to FIG. 8A, initially, the TQD CIP manager 90 determines if there are any registered inspection tasks (step 92). If there are no registered inspection tasks, the TQD manager 90 waits a pre-determined period of time (step 94) until re-determining if there are any inspection tasks. If there are inspection tasks (step 93), the TQD CIP manager 90 will reduce the time-to-live (TTL) value of each inspection task by a certain value (step 98). A content inspection process (CIP) will be aborted (step 102) if its TTL drops below an arbitrary threshold value (step 100). The CIH record of an aborted inspection task will be removed from the CIHL table (step 104). The transmission of the payload may be re-initiated by the sender and/or receiver at a later time.

If the TTL is not less than zero, the TQD CIP manager 90 will reduce the priority for the ith inspection task (step 106) by a pre-determined value.

Once the priority has been adjusted or the ith CIP has been aborted, the TQD CIP manager determines if there are any remaining registered inspection and either waits for a period of time (step 94) to check for registered inspection tasks or continues reviewing and adjusting the status of other registered inspection tasks.

As an example of a possible scheduling scenario, 5 content inspection tasks may have been registered with the TQD CIP manager 90. These registered inspection tasks may include 3 small files (eg. 3 kb each), 1 medium size file (eg. 10 Mb) and 1 large file (eg. 100 Mb) received in any particular order. In processing these inspection tasks, the manager will seek to balance the content inspection in order to maintain efficiency for a desired level of service. For example, scheduling manager parameters may be set to ensure that priority is assigned to inspection of the smaller files first irregardless of the time of receipt. Alternatively, scheduling manager parameters may be set to ensure that priority is assigned strictly based on the time of arrival irregardless of size. As illustrated in FIG. 8A, the system may assign the same initial priority to all the inspection tasks. The scheduling manager then reduces the priority for each of the task with the passage of the time. Further still, scheduling manager parameters may be set as balance between time of arrival and size. That is, in certain situations, the large file may be processed concurrently with the smaller files based on a particular allocation of system resources. Alternatively, the large file may be processed only for a period of time, until the scheduling manager determines that processing has taken too long and the inspection process is aborted for the large file. It is understood that the number of tasks registered with the scheduling manager may be dynamically changed such that priority may be adjusted up or down based on changes to the number of registered tasks.

It is understood by those skilled in the art that the determination of priority and the allocation of system resources to effectively manage content inspection based on content size, and time-to-complete an inspection task may be accomplished by a variety of algorithms and that the methodologies described above are only a limited number of examples of such algorithms.

Classification of Inspection Results

In various embodiments, the content of a data payload, as a recognized payload 14a or an inspected payload 14c can be associated with further information as described below allowing the system to take particular actions with respect to the payload based on the inspection result (FIG. 3).

a) Classification of Content

The inspection result can be classified on the basis of content. For example, it can be a marker indicating that the content is spam, spyware or a virus.

b) Content Instructions

The inspection result can include a set of instructions to alter the content. In this case, the policy module 15 may use these instructions to take further steps with respect to the payload. For example, if the content is marked as a virus, the instructions may be to warn the recipient that the payload contains a virus and should not be opened. In other examples, the instructions may be to prevent the delivery of payload, but to send information indicating that the delivery has been denied.

c) Supplementary Data

The inspection result can be associated with supplementary data. Supplementary data provides further functionality including enhanced security to the methods of the invention.

For example, supplementary data may include the time of creation 44 of the message digest which may be used to provide enhanced security. That is, as it is known that given enough time, an attacker can achieve a collision with the commonly used one-way hash algorithms, by adding time information as supplementary data, a message digest can be retired if the message digest is older than a pre-determined value.

In another embodiment supplementary data may also or alternatively include the size 45 of the payload wherein the size information can be used to provide finer granularity to also reduce the possibility of a hash code collision. In this example, when conducting the CIHL table search function within the lookup table, both the message digest and the size have to match those of the payload.

Deployment

The system may be deployed as an adaptive external module of an existing content inspection system, or as an embedded module within a content inspection system.

Figure 9:
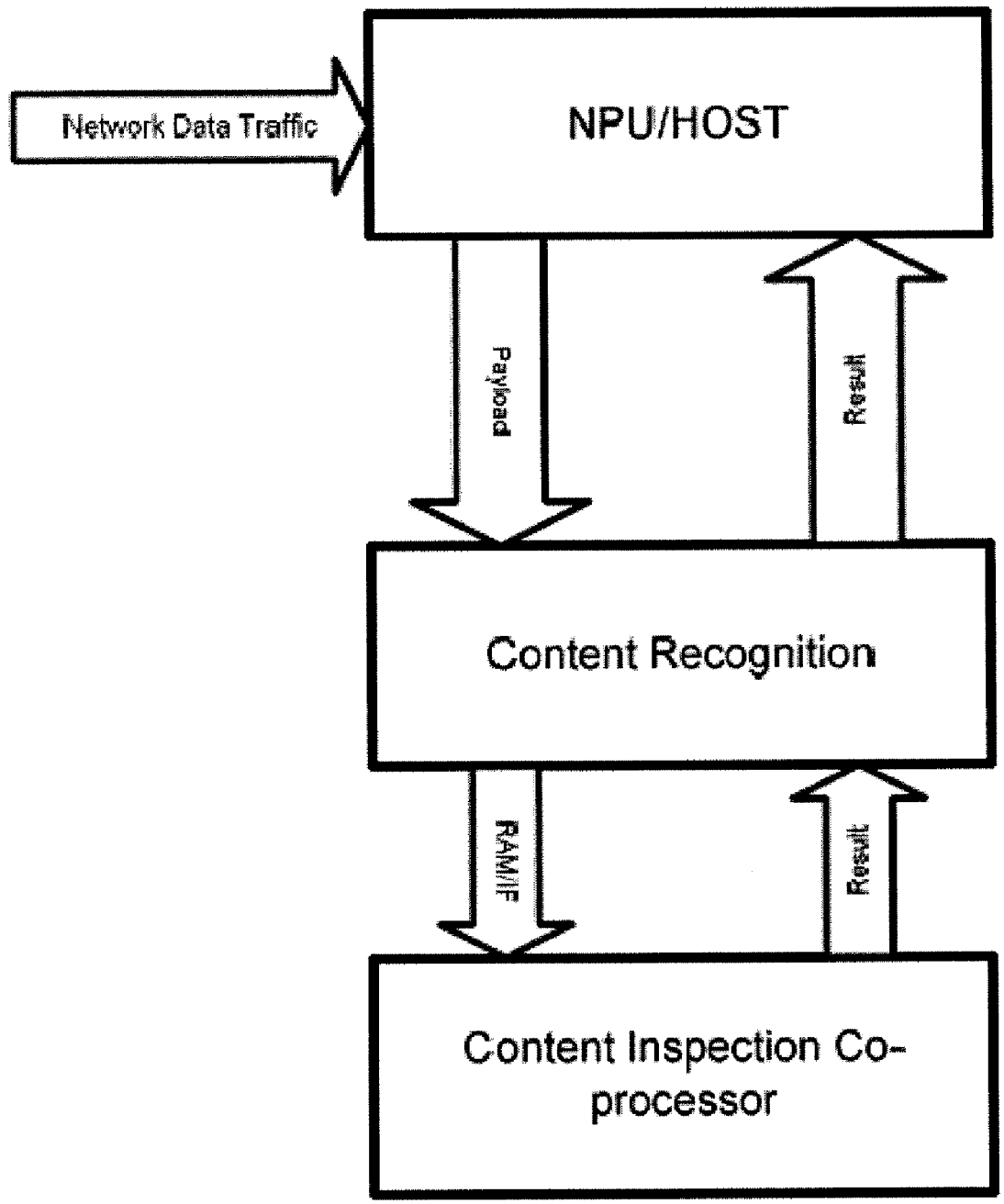
FIG. 9 is a schematic block diagram of the implementation of the system of the invention using a content co-processor in accordance with one embodiment of the invention; and, FIG. 10 is a schematic block diagram of a network showing how multiple servers on a network may learn from the content inspection performed by other servers.

In one embodiment, the system is implemented with the content recognition module interacting with an existing content inspection co-processor as shown in FIG. 9.

In another embodiment, the system is a software component embedded into a content inspection module which is a software module, a co-processor or a computer system.

Figure 10:
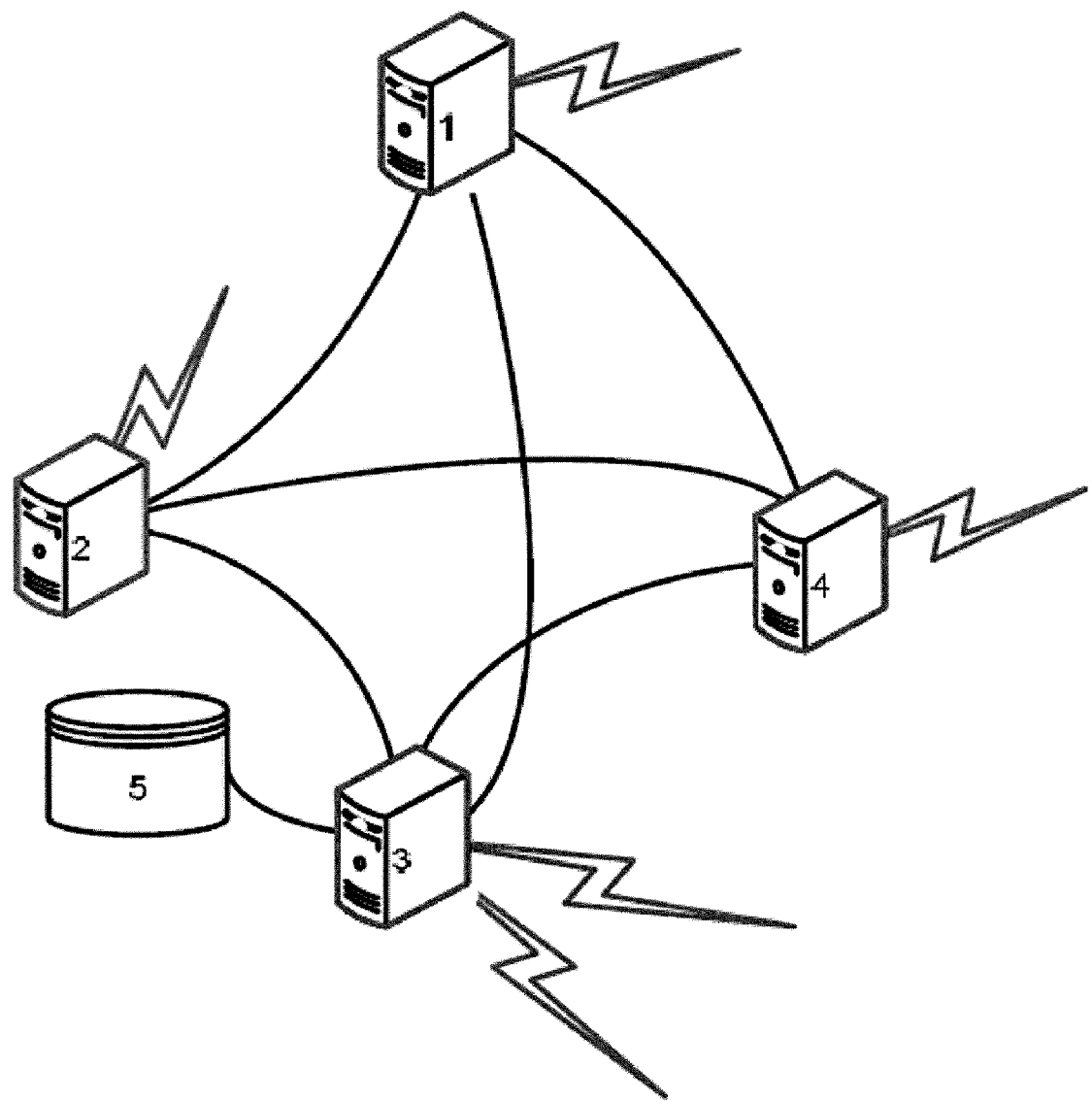

In a further embodiment, and in order to leverage the computation spent on content inspection, the message digests along with the inspection results can be shared among several instances of content recognition/inspection systems as shown in FIG. 10. The sharing can be accomplished by storing the message digests along with the inspection results in a central server shared by these instances of content recognition/inspection systems, or replicating the digests along with the inspection results in each instances of the group. For example, FIG. 10 shows four networked servers that each have external Internet connections that are securely linked via a common internal network. Server 3 is shown to represent the highest traffic server, possibly as an enterprise gateway. Servers 1, 2 and 4 see less traffic but are operatively and securely connected to Server 3. A NBCI database is connected to Server 3. In order to further enhance the efficiency of the system, each server may report the results of their respective payload inspections to Server 3 and hence to database 5 such that each server on the system can "learn" from the experiences of the other Servers, thereby preventing the duplication of content inspection across a larger network. This networked embodiment is particularly beneficial in larger enterprises or service providers where the volume of traffic is sufficiently large that the ability to share such inspection results can greatly enhance the overall efficiency and cost-effectiveness of the system.

The preceding description is intended to provide an illustrative description of the invention. It is understood that variations in the examples of deployment of the invention may be realized without departing from the spirit of the invention.

What is claimed is:

1. A system for enhancing network based content inspection of a plurality of concurrently received data payloads entering a computer network comprising:
   at least one computer, such that at least one computer carries out the steps of:
   a) subjecting each newly arriving data payload to content recognition to determine if the newly arriving data payload content has been previously inspected, has not been inspected or is currently under inspection;
   b) allowing a newly arriving data payload recognized as previously inspected to be delivered without content inspection;
   c) subjecting a newly arriving data payload recognized as not been inspected to content inspection to produce a new payload inspection result whereby the newly arriving data payload becomes a newly inspected data payload;
   d) storing a message digest for the newly inspected data payload with the new payload inspection result in a content history lookup table
   wherein content recognition includes the steps of:
      i) subjecting each newly arriving data payload to a one way hash function to calculate a message digest of the newly arriving data payload;
      ii) comparing the message digest of the newly arriving data payload to previously stored message digests in the content history lookup table wherein each previously stored message digest has an associated inspection result;
   and wherein
      iii) if the message digest of the newly arriving data payload from step ii) is identical to a previously stored message digest determining:
         a. if the previously stored message digest is flagged as inspected then
            i. determining a policy action based on the inspection result; or
         b. if the previously stored message digest is flagged as under-inspection then
            i. waiting a pre-determined time period before repeating step ii).

2. The system of claim 1, wherein the at least one computer further carries out the step of: after content inspection, associating the inspection result and additional information with the message digest.

3. The system of claim 2 wherein the additional information includes any one of or a combination of inspection history information, content classification information and content manipulation instructions.

4. The system of claim 1 wherein a message digest is associated with time of creation information for preventing a collision attack and wherein a message digest is retired if time of creation information exceeds a pre-determined value calculated as less than the time required to achieve a message digest collision.

5. The system of claim 4 wherein a message digest is associated with size information used in conjunction with time of creation information to prevent a message digest collision.

6. The system of claim 5 wherein a content inspection process is aborted when the time spent on the inspection exceeds a predefined threshold to prevent run away inspection processes.

7. The system of claim 1 wherein the data payload is data of an application level network protocol.

8. The system of claim 1 wherein the data payload is decomposed prior to content inspection into logical portions for content inspection.

9. The system of claim 1 wherein, when the computer network is receiving a plurality of data payloads, further comprising the step of assigning a priority to each data payload for content inspection.

10. The system of claim 9 wherein the step of assigning a priority to each data payload is determined on the basis of the time of arrival of individual data payloads and the size of each data payload.

11. The system of claim 10 further comprising the step of allocating computer system resources for content inspection on the basis of the priority assigned to each data payload.

12. The system of claim 9 wherein data payloads are individually registered with a scheduling manager and the scheduling manager assigns priority to each data payload based on the length of time each data payload has been registered with the scheduling manager.

13. The system of claim 1 wherein, when the computer network is receiving a plurality of data payloads, further comprising the step of temporarily preventing content inspection of data payloads determined to be identical to a data payload currently identified as under-inspection.

14. The method of claim 1 wherein a data payload recognized as previously inspected in step b) is delivered to a policy module wherein a policy action is determined by the previous inspection result stored in the content history lookup table.

15. A system for enhancing network based content inspection of a plurality of concurrently received data payloads comprising:
   at least one computer, the at least one computer having a content recognition module for recognizing if each newly arriving data payload has been previously inspected for content, has not been inspected or is currently under inspection wherein the content recognition module:
   allows a newly arriving data payload recognized as previously inspected to be delivered without content inspection;
   subjecting a newly arriving data payload recognized as not been inspected to content inspection to produce a new payload inspection result and whereby the newly arriving data payload becomes a newly inspected data payload;

storing the message digest for the newly inspected data payload with the new payload inspection result in a content history lookup table wherein content recognition includes the steps of:
  i) subjecting each newly arriving data payload to a one way hash function to calculate a message digest of the newly arriving data payload;
  ii) comparing the message digest of the newly arriving data payload to previously stored message digests in the content history lookup table wherein each previously stored message digest has an associated inspection result;

and wherein
  iii) if the message digest of the newly arriving data payload from step ii) is identical to a previously stored message digest determining:
    c. if the previously stored message digest is flagged as inspected then
      i. determining a policy action based on the inspection result; or
    d. if the previously stored message digest is flagged as under-inspection then
      i. waiting a pre-determined time period before repeating step ii).

16. The system of claim 15 wherein the content inspection module is a co-processor.

17. The system of claim 15 wherein the content inspection module utilizes CAM (Content-Addressable Memory).

18. The system of claim 15 wherein the system comprises at least two content inspection modules operatively connected to a common look-up table.

19. The system of claim 18 wherein the results of content inspection from at least two content modules is added to the common look-up table.

* * * * *